US012639709B2

(12) United States Patent
Zimmerman et al.

(10) Patent No.: US 12,639,709 B2
(45) Date of Patent: May 26, 2026

(54) OPEN-LOOP NETWORK UNIVERSAL ACCEPTANCE

(71) Applicant: MULTI SERVICE TECHNOLOGY SOLUTIONS, INC., Overland Park, KS (US)

(72) Inventors: Daniel Wayne Zimmerman, Overland Park, KS (US); John George Jakobe, Kansas City, MO (US); Christopher Alan Kirke, Overland Park, KS (US)

(73) Assignee: Multi Service Technology Solutions, Inc., Overland Park, KS (US)

( * ) Notice: Subject to any disclaimer, the term of this patent is extended or adjusted under 35 U.S.C. 154(b) by 69 days.

(21) Appl. No.: 18/400,665

(22) Filed: Dec. 29, 2023

(65) Prior Publication Data

US 2024/0220979 A1　Jul. 4, 2024

Related U.S. Application Data

(60) Provisional application No. 63/478,048, filed on Dec. 30, 2022.

(51) Int. Cl.
*G06Q 20/40* (2012.01)
*G06Q 10/0875* (2023.01)
*G06Q 30/04* (2012.01)

(52) U.S. Cl.
CPC ......... *G06Q 20/40* (2013.01); *G06Q 10/0875* (2013.01); *G06Q 30/04* (2013.01)

(58) Field of Classification Search
CPC .... G06Q 20/40; G06Q 10/0875; G06Q 30/04; G06Q 20/102; G06Q 20/24; G06Q 20/405; G06Q 40/03
See application file for complete search history.

(56) References Cited

U.S. PATENT DOCUMENTS

| | | | |
|---|---|---|---|
| 10,692,140 B1 * | 6/2020 | Kim | G06Q 20/405 |
| 2006/0173772 A1 * | 8/2006 | Hayes | G06Q 40/02 705/37 |
| 2012/0101881 A1 * | 4/2012 | Taylor | G06Q 30/04 705/14.36 |

* cited by examiner

*Primary Examiner* — A. Hunter Wilder
(74) *Attorney, Agent, or Firm* — Shook, Hardy & Bacon L.L.P.

(57) ABSTRACT

Aspects of this invention provide for allowing a customer which has been issued trade credit to use that credit through an open loop payment network. A purchase from a merchant using an open loop payment network associated with that customer's trade credit account is requested to be approved. A credit manager can then approve or deny the transaction. Once the transaction is approved, the credit manager is provided transaction information through a number of processes described herein. The credit manager also initiates the payment of the merchant through a supporting bank. Once the transaction information is received by the credit manager, the credit manager can then issue an invoice based on the trade credit terms agreed upon when the customer was issued trade credit.

20 Claims, 7 Drawing Sheets

OPEN-LOOP NETWORK UNIVERSAL ACCEPTANCE

CROSS-REFERENCE PARAGRAPH

This application claims the priority benefit of U.S. Provisional Application No. 63/478,048, titled "OPEN-LOOP NETWORK UNIVERSAL ACCEPTANCE", filed on Dec. 30, 2022, which is incorporated herein in its entirety.

BACKGROUND

Trade credit transactions are submitted to a trade credit manager or trade credit provider by businesses or merchants to request approval for those transactions prior to purchase. Each transaction requires the approval prior to purchase or funding of the purchase. This can be a drawn-out process that can be cumbersome for businesses and merchants to conduct efficient business.

SUMMARY

At a high level, aspects described herein relate to systems and methods that process trade credit purchase approval from a credit manager using an open loop payment network. The present technological advance can resolve technological issues with the current approval of trade credit purchases.

In one aspect a system is provided that allows a customer which has been issued a trade credit account to use that credit by means of an open loop payment network. The customer may initiate a purchase from a merchant by using a card or account number associated with that customer's trade credit account. Once the purchase is initiated, a credit manager is contacted for approval of the purchase against the customer's trade credit. The credit manager can then authorize the transaction.

Once the transaction is authorized, the credit manager receives information about the purchase from the merchant. This information is provided to the credit manager through a number of alternative processes described herein. The credit manager also initiates the payment of the merchant through a supporting bank. Once the transaction information is received by the credit manager, the credit manager can then issue an invoice based on the trade credit terms agreed upon when the customer was issued trade credit.

This summary is intended to introduce a selection of concepts in a simplified form that is further described in the detailed description section of the present disclosure. It is neither intended to identify key or essential features of the claimed subject matter, nor is it intended to be an aid in determining the scope of the claimed subject matter. Additional objects, advantages, and novel features of the technology will be set forth in part in the detailed description that follows, and in part will become apparent to those skilled in the art upon examination of the present disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
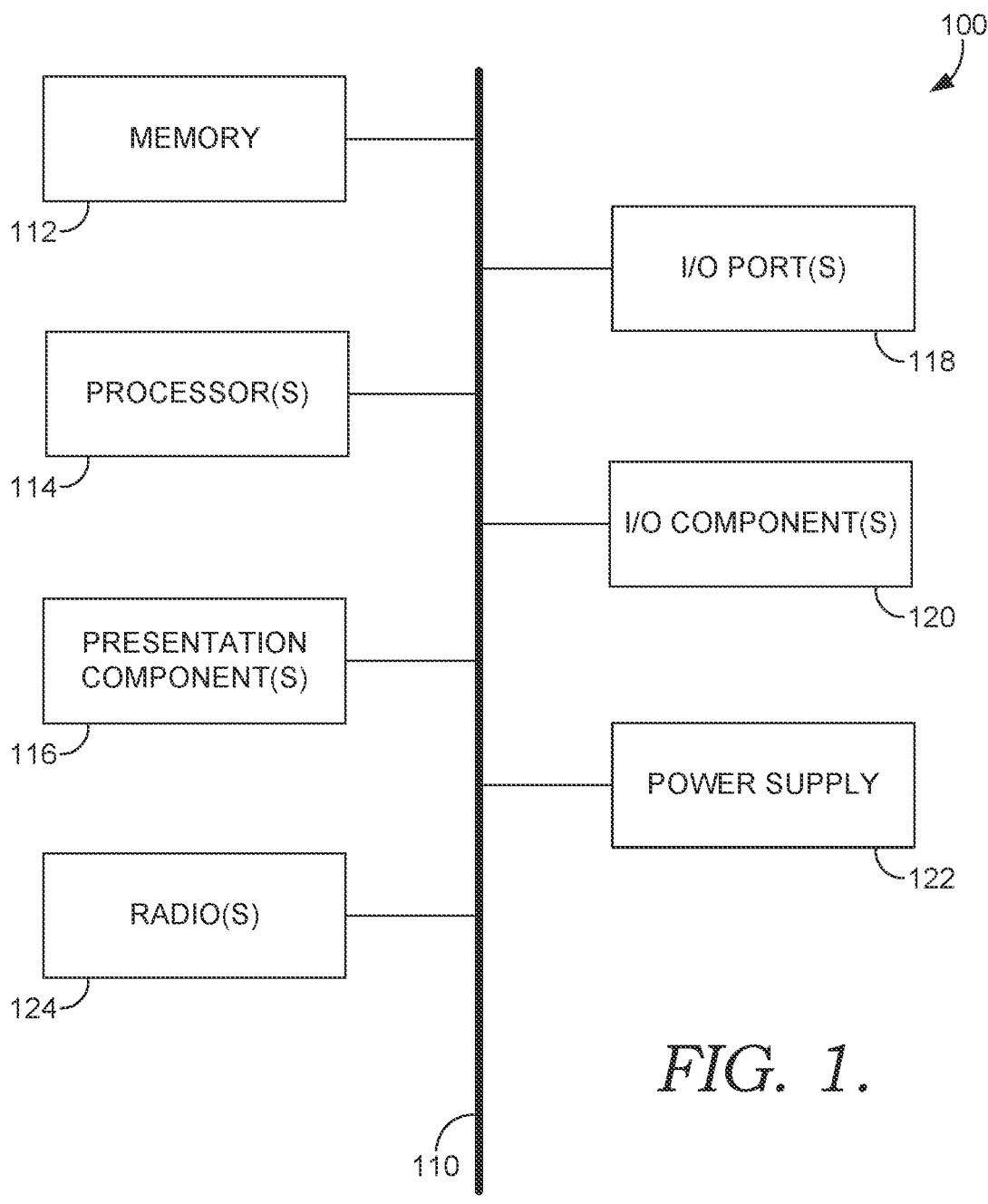
FIG. 1 is an example computing device suitable for implementing aspects of the present disclosure, in accordance with an embodiment described herein.

Merchant trade credit transactions are paid and authorized using invoices and other means of authorization. There is currently a need for a merchant trade credit user to be able to access the issued trade credit using an open loop payment network. Potential customers seeking trade credit will complete a credit application equipped with flexible data fields and instant decisioning. Upon approval, purchasers will be provided a trade credit card for purchasing. This trade credit card will utilized an open loop payment network. The size of the credit line and the underlying risk will be supplied and managed by a credit manager or the entity which provided the credit. Cards can be either physical or virtual and will have a BIN range that is accepted at all existing merchant point-of-sale devices and ecommerce stores that accept open loop network payments.

Upon completing a purchase, customers will be provided a detailed invoice including stock keeping unit (SKU)-level details for optimized reconciliation. Invoices can be populated/branded within a credit manager customer portal or they can be generated and submitted directly to the customer's systems for automated payments. This mechanism will provide business customers with free working capital via the credit line and are relieved of rigid repayment options and cash flow constraints. Net terms helps eliminate fraudulent spending and creates an auditable process that ultimately saves money.

From the merchant perspective there is little to no additional work needed in order to enable their systems to accept this new card type. The cost of acceptance will be similar to interchange on corporate credit cards. This system also eliminates the need for merchants to operate and maintain an in-house credit program, guaranteeing an improvement of day sales outstanding and eliminating risk/credit related write-offs.

The SKU-level data is sent from the merchant to the credit manager in a number of ways as described herein. This SKU-level data will be used to populate any invoice sent to the customer or purchaser. The merchant could also pass on level III data (e.g., merchant specified line item details at the time of purchasing an item or service beyond that is minimally required for traditional credit card transactions) at the point of purchase. This can be accomplished either through the card networks, credit manager application programming interfaces (APIs), or via receipt systems. The merchant would be able to select the option that best fits their needs.

In some aspects, a merchant may be a buyer, a seller, or any other business or personal entity. In one embodiment, the merchant entity may be a seller. The seller may be any corporate, commercial, charitable, religious, non-profit, and/or other entity (including commercial customer's employees, agents, or other authorized persons) that sells goods or services to a buyer/purchaser/customer. In an alternative embodiment, the customer may be a purchaser. The purchaser may be any corporate, commercial, charitable, religious, non-profit, and/or other entity (including commercial customer's employees, agents, or other authorized persons) that buys goods or services from the seller. Additionally, in some aspects the acquirer may be related to the merchant or the merchant itself.

In additional aspects, an issuer processor is a type of financial institution that acts as a go-between for merchants and cardholders. The processor facilitates the approval and processing of credit and debit card transactions. Issuer processors are also sometimes referred to as acquirers or payment processors.

An open loop payment network includes at least one open loop universally accepted credit card, debit card or mobile payment processing network that is an internationally identified financial card or mobile payment service, typically under trademarks such as Visa™, MasterCard™, American Express™, Discover™, Diners Club™, JCB™ (accepted in Japan), Union Pay™ (accepted in China) and the like. These are international (universal) networks which enable hundreds of millions of payers or mobile phone subscribers to purchase goods and services at millions of merchant locations. Furthermore, funding rules, returns, fraud coverage and consumer protection governance are stringent and rarely changed. While interest and surcharge rates can be changed frequently, how a merchant authorizes and settles (deposits) funds at their bank is very well defined and rarely modified.

Relative to existing technologies and computer functionality, the methods of the present disclosure reduce network latency, reduce packet generation costs, and reduce computer input/output (I/O), among other computer function benefits. This is because particular embodiments reduce the number of hardware components that need to be contacted, over a computer network, at a credit application processor, since the communication with the external sources occurs using a single service or a server rather than multiple services or servers at a time. What this means is that fewer (or no) packets have to be generated and sent over the computer network. Each time a service is contacted, for example, contents or payload of the request is typically supplemented with header information or other metadata within a packet in TCP/IP or other protocol networks. Accordingly, when this functionality is multiplied by all the services needed to obtain the desired data, there are network latency costs by repetitively generating the metadata and sending it over the computer network. However, as described above, communication with external sources occurs using only the single service or the server, which means there are fewer packets to generate and fewer messages to traverse the computer network, thereby reducing network latency. This has a further technical effect of decreasing the computer I/O. With respect to the existing technologies, continuous communication with multiple services increases storage device I/O (for example, excess physical read/write head movements on non-volatile disk) because, with each communication or data packet sent, a computing system has to reach out to the storage device I/O to perform a read or write operation, which is error prone, and eventually wears on components, such as a read/write head. When multiplied by all the multiple service communication requirements, this causes excessive wear on the read/write head and causes excessive energy consumption and heat, which leads to other computational issues, such as memory errors. However, as described above, there are fewer (or no) times that embodiments perform I/O. Consequently, there is not as much wear and tear on the read/write head, and there is not as much energy consumption and heat generation, and hence the likelihood of memory errors is reduced.

Additionally, in some embodiments, the methods of the present disclosure improve computer security relative to existing technologies because the external sources are contacted and accessed using the single service rather than multiple services. In other words, more the number of times a data packet has to traverse the computer network (which occurs with existing technologies), higher the likelihood that data will be sniffed or otherwise compromised. Sniffing is a process of monitoring and capturing all data packets passing through a given network. Attackers use sniffer code to capture data packets containing sensitive information, such as password, account information, and the like. However, as described above, some embodiments only use the single service rather than multiple services, which means there are less packets getting transmitted over the computer network, which consequently means that the data is less likely to be sniffed by attackers. The centralized integration service is also easily modifiable to adapt to changing external source code or systems since the centralized integration service is built based on the volatility based decomposition architecture that allows for only a portion of the architecture to be changed at a time.

This fragmented approach extends to invoice financing technologies, resulting in substantial time consumption, incomplete information, and the application of a considerable amount of effort, impeding the swift and effective planning and execution of financial operations. The lack of a unified platform that gathers all pivotal invoice financing data in one centralized location—for example, a single user interface page—exacerbates these inefficiencies, introducing potential delays and operational stagnations. Moreover, consolidating comprehensive information into a unified format or user interface that is easily navigable represents a crucial technological advancement over the existing systems. It would not only streamline operations but also foster a more intuitive and user-friendly environment, wherein individuals and institutions can make informed decisions swiftly, leveraging the aggregated data and insights at their fingertips. This represents a marked departure from the current state of affairs, ushering in a new era of efficiency and intelligence in invoice financing technologies.

Leveraging data from a variety of sources and centralizing it into a singular, standardized format or user interface substantially elevates the present technology, enriching the efficacy, precision, and interoperability of information management in the invoice financing sphere. This consolidation into a unified format or interface not only smoothens the pathway for data integration and analysis but eradicates inconsistencies spawned from managing diverse data structures and types. This transformative step facilitates the fluid exchange of information across different platforms and applications, nurturing real-time collaborative decision-making. For stakeholders in invoice financing, including applicants and financial institutions, this innovation means rapid and unencumbered access to essential data concerning loan offerings, applicant histories, and credit terms. This centralization lays the ground for more precise comparisons, trending analyses, and forecasts, enhancing the overall quality of financial planning and operations in the sector. Thus, the unified data format emerges as a technological linchpin, forging connections between various data reservoirs and augmenting the operability and usability of invoice financing systems. It aims to engender a more streamlined and intelligent approach to data handling, thereby standing to significantly revolutionize the invoice financing landscape.

It will be realized that the method previously described is only an example that can be practiced from the description that follows, and it is provided to understand the technology and recognize its benefits. Additional examples are now described with reference to the figures.

With initial reference to FIG. 1, the computing device 100 includes a bus 110 that directly or indirectly couples the following devices: the memory 112, one or more processor(s) 114, one or more presentation component(s) 116, input/output port(s) 118, input/output components 120, and illustrative power supply 122. The bus 110 represents what may be one or more busses (such as an address bus, data bus, or a combination thereof).

Although the various blocks of FIG. 1 are shown with lines for the sake of clarity, in reality, delineating various components is not so clear, and metaphorically, the lines would more accurately be grey and fuzzy. For example, one may consider a presentation component, such as a display device, to be an I/O component 120. As another example, processor(s) 114 may also have memory. Such is the nature of the art, and it is again reiterated that the diagram of FIG. 1 merely illustrates an example computing device that can be used in connection with one or more embodiments of the present disclosure. Distinction is not made between such categories as "workstation," "server," "laptop," "hand-held device," "point-of-sale device," "mobile device" etc., as all are contemplated within the scope of FIG. 1 and reference to the "computing device."

The computing device 100 typically includes a variety of computer-readable media. The computer-readable media can be any available media that can be accessed by the computing device 100 and includes both volatile and non-volatile media, and removable and non-removable media. By way of non-limiting example, the computer-readable media may comprise computer storage media and communication media.

The computer storage media includes volatile and non-volatile media, removable and non-removable media implemented in any method or technology for storage of information, such as computer-readable instructions, data structures, program modules or other data. The computer storage media includes, but is not limited to, random-access memory (RAM), read-only memory (ROM), electronically erasable programmable read-only memory (EEPROM), flash memory or other memory technology, compact disc read-only memory (CD-ROM), digital versatile disks (DVDs) or other optical disk storage, magnetic cassettes, magnetic tape, magnetic disk storage or other magnetic storage devices, or any other medium that can be used to store the desired information that can be accessed by the computing device 100. The computer storage media excludes signals per se.

The communication media typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information associated therewith. By way of non-limiting example, the communication media includes wired media, such as a wired network or direct-wired connection; and wireless media, such as acoustic, RF, infrared, and other wireless media. Combinations of any of the above should also be included within the scope of computer-readable media.

The memory 112 includes computer storage media in the form of volatile or nonvolatile memory. The memory 112 may be removable, non-removable, or a combination thereof. Example hardware devices include solid-state memory, hard drives, optical-disc drives, etc. The computing device 100 includes one or more processor(s) 114 that read data from various entities, such as the memory 112 or the I/O components 120. The presentation component(s) 116 present data indications to a user or other device. Examples of the presentation component(s) 116 include a display device, speaker, printing component, vibrating component, etc.

The I/O port(s) 118 allow the computing device 100 to be logically coupled to other devices including the I/O components 120, some of which may be built in. Illustrative components include a microphone, joystick, game pad, satellite dish, scanner, printer, wireless device, and the like.

Figure 2:
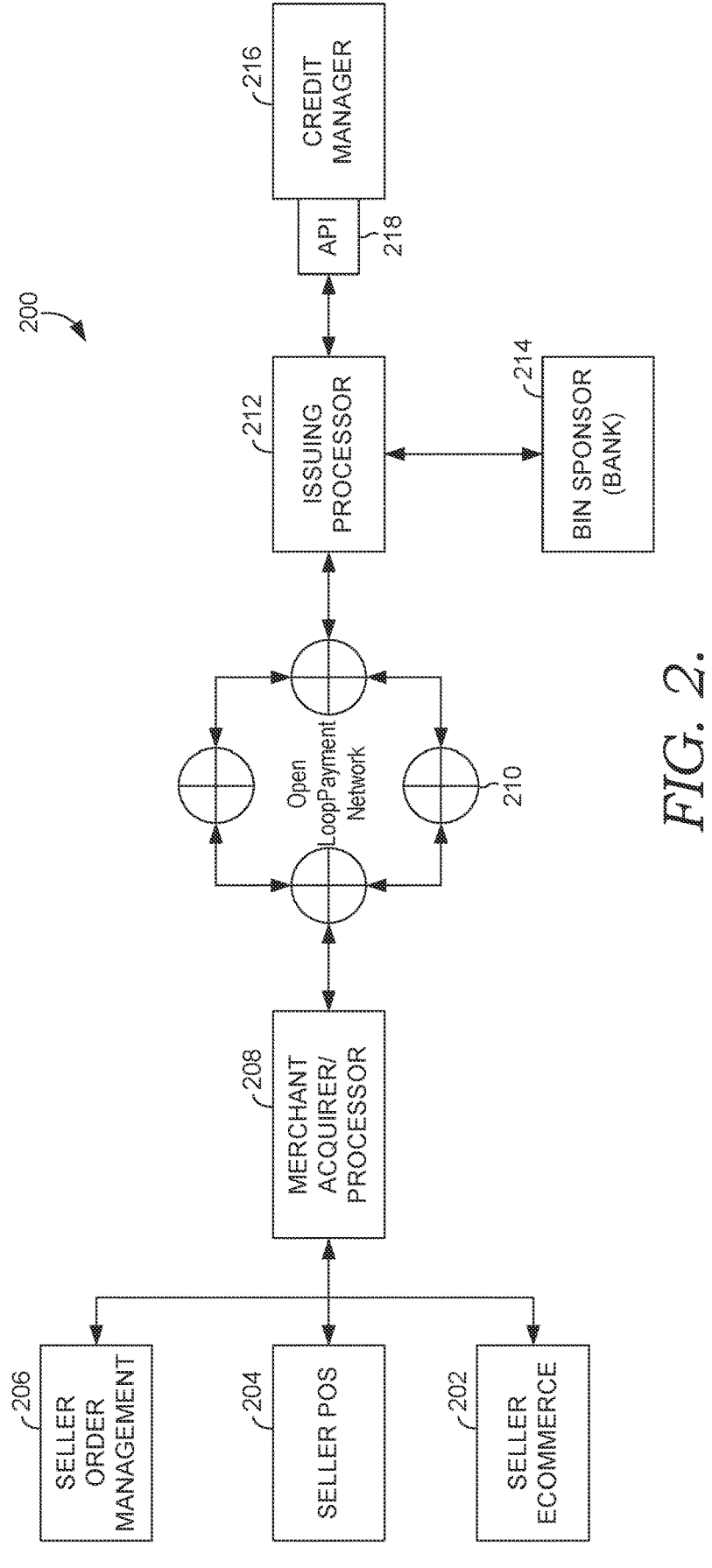
FIG. 2 is an example operating environment, in accordance with an aspect described herein.

With reference now to FIG. 2, which is an example operating environment 200 in which aspects of the present disclosure can be employed to process and authorize a payment with respect to an open loop payment network. As illustrated, the operating environment 200 comprises a seller commerce portion, a seller point-of-sale (i.e., POS) 204, a seller order management 206, a merchant processor 208, an open loop payment network 210, an issuing processor 212, a BIN sponsor 214, a credit manager 216, and API 218.

The network may include one or more networks (for example, public network or virtual private network "VPN"). In a non-limiting example, the network may include one or more local area networks (LANs), wide area networks (WANs), or any other communication network or method. Each of the components in FIG. 2 may communicate directly or indirectly with other components through the network.

The operating environment 200 further comprises a data store. The data store generally stores information including data, computer instructions (for example software program instructions, routines, or services), or models used in the embodiments of the present disclosure. Although depicted as a single data store component, the data store is embodied as one or more data stores or is in the cloud or other distributed architectures. One example suitable for use as the data store is memory discussed with reference to FIG. 2.

The data store may include one or more storage devices configured to collect, store, delete, update, and/or modify data in accordance with one or more instructions received from one or more other components, the user serve. For example, the data store may include any suitable combination of one or more storage mediums, such as hard disk drives, solid state memory, cloud-based storage devices, etc. In various aspects, the data store may store data in addition to or instead of data stored locally by the user server. In doing so, the user server and any other server, the data store, and/or other back-end components may store any suitable type of data used to facilitate various functionalities of certain aspects as described herein.

Having identified various components of the operating environment 200, it is emphasized that any additional or fewer components, in any arrangement, may be employed to achieve the desired functionality and are within the scope of the present disclosure. Although, the various components of FIG. 2 are shown with lines for the sake of clarity, the lines can illustrate a direct path of communication from one component to another or may represent a path where other intermediary components are present.

While the components of FIG. 2 are depicted as single components, the depictions are intended as examples in nature and in number and are not to be construed as limiting for all implementations of the present disclosure. Other arrangements and elements (for example machines, interfaces, functions, orders, and groupings of functions, etc.) can be used in addition to or instead of those shown, and some elements may be omitted altogether. Therefore, for the sake of brevity and clarity, when the components of FIG. 2, or any other figure, are referred to in singular, it is intended to include functions performed by one or more components working together.

The functionality of the operating environment 200 can be further described based on the functionality of the described components. That is, many of the components described in relation to FIG. 2 are entities that perform functions. Various functions described herein are being performed by one or more components and may be carried out by a hardware, a firmware, and/or a software. That is, functions performed by the components of FIG. 2 can be performed by executing computer-executable instructions stored in memory, such as the data store.

In general, a processor, such as the merchant processor 208, may operate with computer-readable media. The merchant processor 208 executes instructions on the computer-readable media. The merchant processor 208 operates to facilitate the sale and processing of purchases made by a user or a customer which has been authorized to access merchant credit by the credit manager 216. The merchant processor 208 facilitates the operation of the seller order management 206, the seller POS 204, and the seller ecommerce 202. The seller ecommerce 202, seller POS 204 and Seller order management 206 operates to allow the customer to be able to user the open loop payment network 210 and the trade credit provided by the credit manager 216 to be able to purchase items or services on trade credit rather than consumer credit. The seller order management 206 provides order management, bills of sale, SKU data, settlement files, approval requests, purchase orders, and many other operations.

The open loop payment network 210 is used to facilitate the transfer of funds from the issuing processor 212 and the BIN sponsor 214 to a merchant relying on the merchant processor 208. A BIN sponsor, such as the BIN sponsor 214, is responsible for issuing BIN ranges associated with a payment card, which are generally the first six numbers on a payment card that identify the bank which issued the payment card of the 8 digits. The user, such as a customer, of the trade credit will hold an account or card associated with the open loop payment network 210. This account will be used to process transactions at the seller POS 204 and/or the seller Ecommerce 202 (i.e., seller electronic commerce). By having an open loop payment network associated with the user's trade credit issued by the credit manager, the user is able to have trade credit terms associated with an open loop payment network 210 account.

The credit manager 216 is operated, in an example, by initially issuing trade credit on open terms and trade credit terms. This may be done using industry standard methods.

Once the credit manager 216 issues the trade credit to the user, an account is opened and a card or account is set-up with the open loop payment network 210 to allow the user to access the issued trade credit using traditional open loop payment network 210 methods. In other aspects, the issuing processor 212 issues a card or account associated with the open loop payment network 210. The issuing processor 212 will be backed or supported by the BIN sponsor 214, which is a bank that will fund transactions made through the open loop payment network 210 by the user of the issued trade credit. The credit manager 216 will also approve requested transactions by determining if there is available credit for the user. Once the transaction has occurred, the credit manager 216, in an example, will request bills of sale, itemized details, or other information useful for detailing the underlying transaction from the merchant. The credit manager 216 will manage and request payment by the user according to the agreed upon trade credit terms.

The technology of the present disclosure is described in the general context of computer code or machine-useable instructions, including computer-executable instructions, such as program modules, being executed by a computer or other machine, such as a personal data assistant or other handheld device. Generally, the program modules including routines, programs, objects, components, data structures, etc., refer to a code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Referring now to FIGS. 3A-3E, which contain an example operating environment 300 with alternative methods of being utilized for processing and approving a trade credit purchase, in accordance with aspects provided herein. It should be understood that the operating environment 300 is an example that can be performed using the current technology, and that other processes for processing and approving the trade credit purchases and variations of the operating environment 300 are contemplated but are not discussed in detail for brevity. The operating environment 300 can be performed by the components of FIG. 1 and provides many of the benefits and advantages discussed herein. As illustrated, the operating environment 300 comprises a merchant 302, a merchant acquirer processor 304, an open loop payment network 306, an issuer processor 308, a credit manager 310 and a bank 312.

Having identified the various components of the operating environment 300, it is emphasized that any additional or fewer components, in any arrangement, may be employed to achieve the desired functionality and are within the scope of the present disclosure. Although, the various components of FIGS. 3A-3E are shown with lines for the sake of clarity, the lines can illustrate a direct path of communication from one component to another or may represent a path having other intermediary components. Further, as discussed above the various components of the operating environment 300 may communicate through one or more networks, directly or indirectly, as provided herein. A customer is depicted in connection with FIGS. 3A-3E. A customer is a purchaser of goods and/or services. The customer in some examples is a commercial entity, such as a business. A customer may also be an individual, in some examples.

While the components of FIG. 3A-3E are depicted as single components, the depictions are intended as exemplary in nature and in number and are not to be construed as limiting for all implementations of the present disclosure. Other arrangements and elements (for example machines, interfaces, functions, orders, and groupings of functions, etc.) can be used in addition to or instead of those shown, and some elements may be omitted altogether.

Figure 3A:
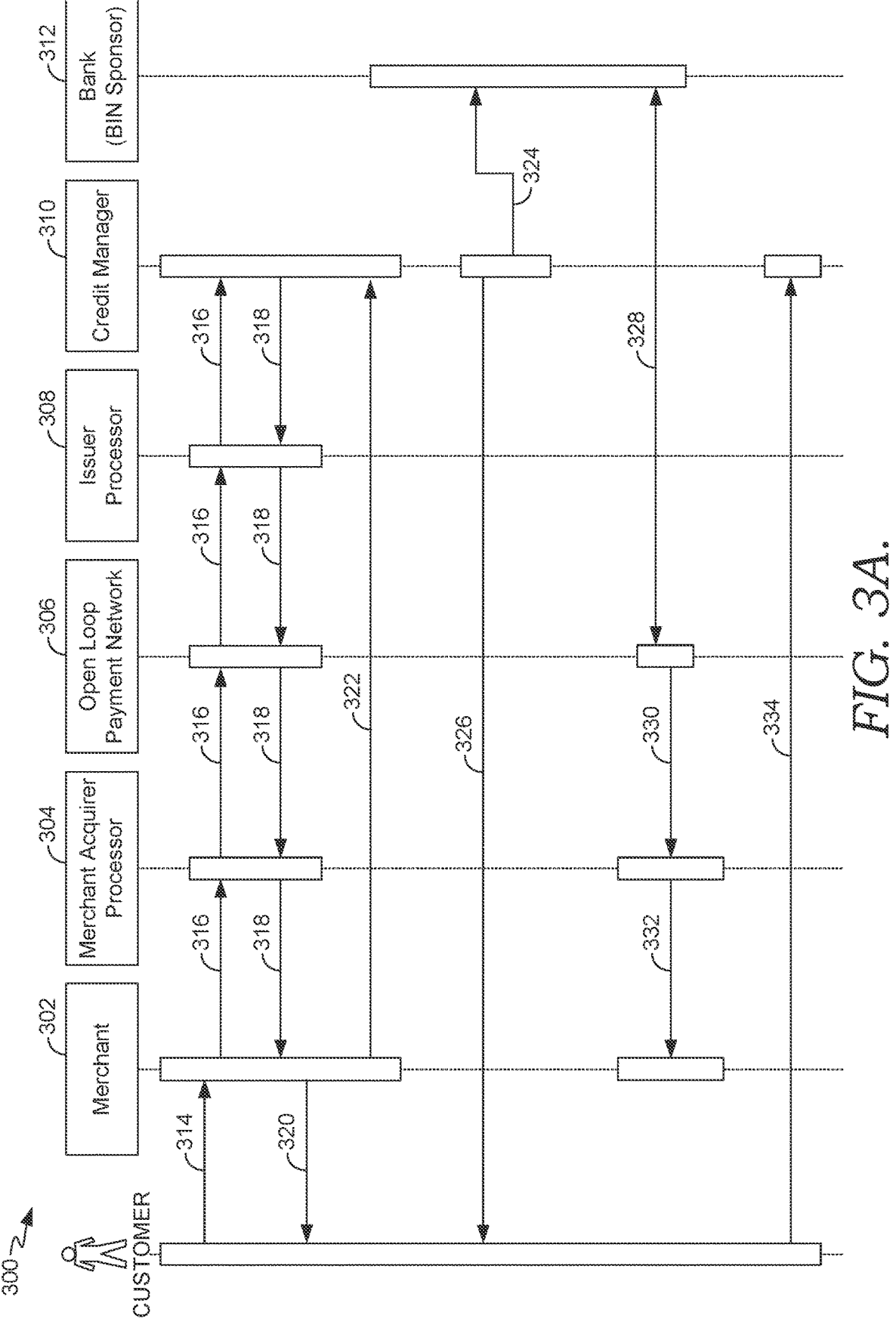
FIGS. 3A-3E are example process flows that can be performed by components of the operating environment of FIG. 2 and the computing device of FIG. 1, in accordance with an aspect described herein.

Beginning with FIG. 3A, the customer in one aspect is approved by the credit manager 310 to be issued trade credit. Such trade credit is a business-to-business agreement in which the customer is able to purchase goods and/or services from the merchant 302 using the open loop payment network 306 with a card/account issued by the issuer processor 308. The transactions are backed by a BIN sponsor. In one aspect, the BIN sponsor is a sponsoring bank, such as bank 312. The customer is able to purchase goods and services from the merchant 302 and pay at a later time through the recorded transaction while still allowing the merchant 302 to be paid by the bank 312. The customer may request to purchase goods or services at step 314 from the merchant 302. This request to purchase is done using an approved card or account number issued using the customer's trade credit account. The issuer processor 308 issues a card that has access to the open loop payment network 306. Once the request to purchase at step 314 is made at the merchant 302, the merchant requests authorization for trade credit to be used in the transaction at step 316. Traditionally, in consumer credit approvals, the issuer processor 308 approves the trade credit. However, in accordance with the present disclosure, the credit manager 310 (i.e., the issuer of the trade credit approves the transaction requesting the trade credit access. Trade credit allows the customer to pay on a revolving debt basis on 30, 60, 90-day terms, or any other terms agreed to between the customer and the credit manager 310. As such, the credit manager 310 maintains a log or dataset associated with the issued trade credit and is able to determine if there is sufficient credit available for the requested purchase. Once the credit manager 310 determines there is sufficient credit, an approval notification is sent via step 318 by way pf the issuer processor 308, the open loop payment network 306, the merchant acquirer processor 304, and the merchant 302. The merchant 302 then fulfills the purchase at step 320.

At step 322, the merchant 302 sends SKU-level data to the credit manager 310. The SKU-level data may include, but is not limited to, item/service description, item/service identifier, number ordered, and other details about the purchase. The SKU-level data may include data that would be found on an invoice that is typically provided for a trade credit type purchase. The SKU-level data may be sent via any electronic or other means. The credit manager 310 (or other components in the operating environment 300) may request the SKU-level data or the merchant 302 may automatically send the SKU-level data. In addition to SKU data, the system may send an itemized list of purchased items or services.

At step 324 the credit manager 310 requests funding from the bank 312, sometimes referred to as daily funding. The credit manager 310 maintains a log of all purchases approved for the covered period of time (e.g., the day) and requests transfer for the funds to satisfy those purchase obligations. This request to fund all transactions during the covered time period occurs at step 324. At step 326, credit manager 310 communicates the funding of transactions to the customer by way of an invoice or bill. The funds are transferred from the bank 312 at step 328 to the open loop payment network 306 as an intermediary to pay off the debts supported through that network. The open loop payment network 306 is then used to pay the merchant acquirer processor 304 at step 330 and also pays the merchant 302 at step 332. At step 326, the credit manager 310 will send the customer an invoice based on the purchase, the SKU-level data, and/or the payment terms. At step 334, the customer pays the invoice to the credit manager 310 which then in turn uses those funds to satisfy the credit issued and the bank 312 backed funding.

As can be appreciated, FIG. 3A provide an example of the flow of information/data/funds/requests/communications between the components in the operating environment 300 to support a trade credit transaction with a credit manager and a customer over an open loop payment network. Additional approaches are contemplated here, such as those illustrated in connection with operating environment 300 in other examples.

Figure 3B:
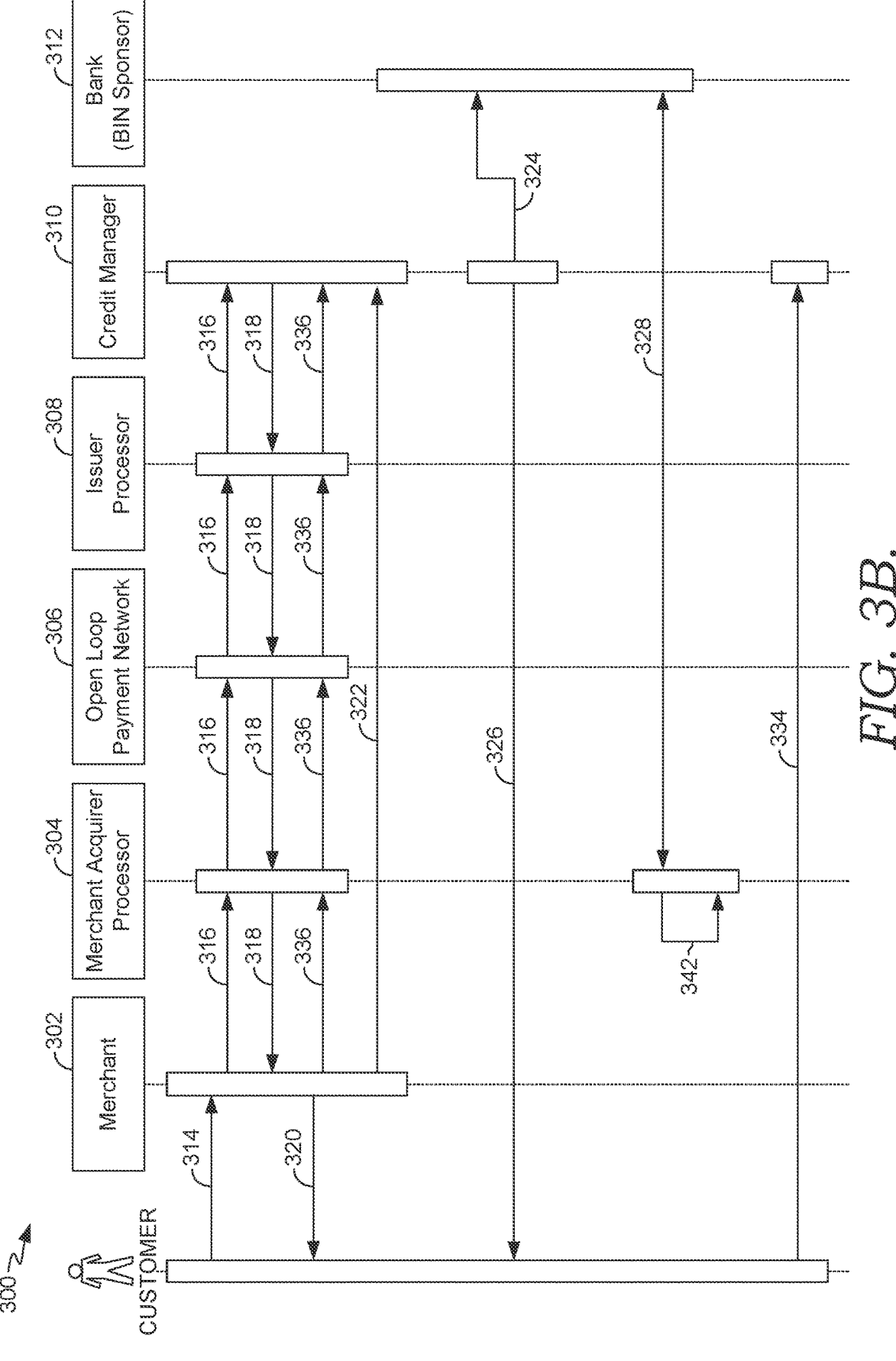

Moving now to FIG. 3B which incorporates all portions described in FIG. 3A while illustrating an alternative methodology of implementation in connection with the operating environment 300, in accordance with an aspect herein. At step 336, the merchant 302 sends a settlement file to the credit manager 310 by way of the merchant acquirer processor 304, the open loop payment network 306, and the issuer processor 308. The settlement file includes information related to the purchase and the bank settlement of payment. The bank 312, based on the settlement file, may pay the merchant acquirer processor 304 directly at step 328, which will then deposit funds to satisfy the purchase into the bank account of the merchant 302. The settlement file that is sent at step 326 can include information related to the payment of the merchant bank account at step 342 by the merchant acquirer processor 304. This may include date paid, date amount paid, any disputes by the merchant 302, and/or any other information related to the purchase, payment, transaction information, a merchant 302 uniform resource locator (URL), transaction ID, and the like.

Figure 3C:
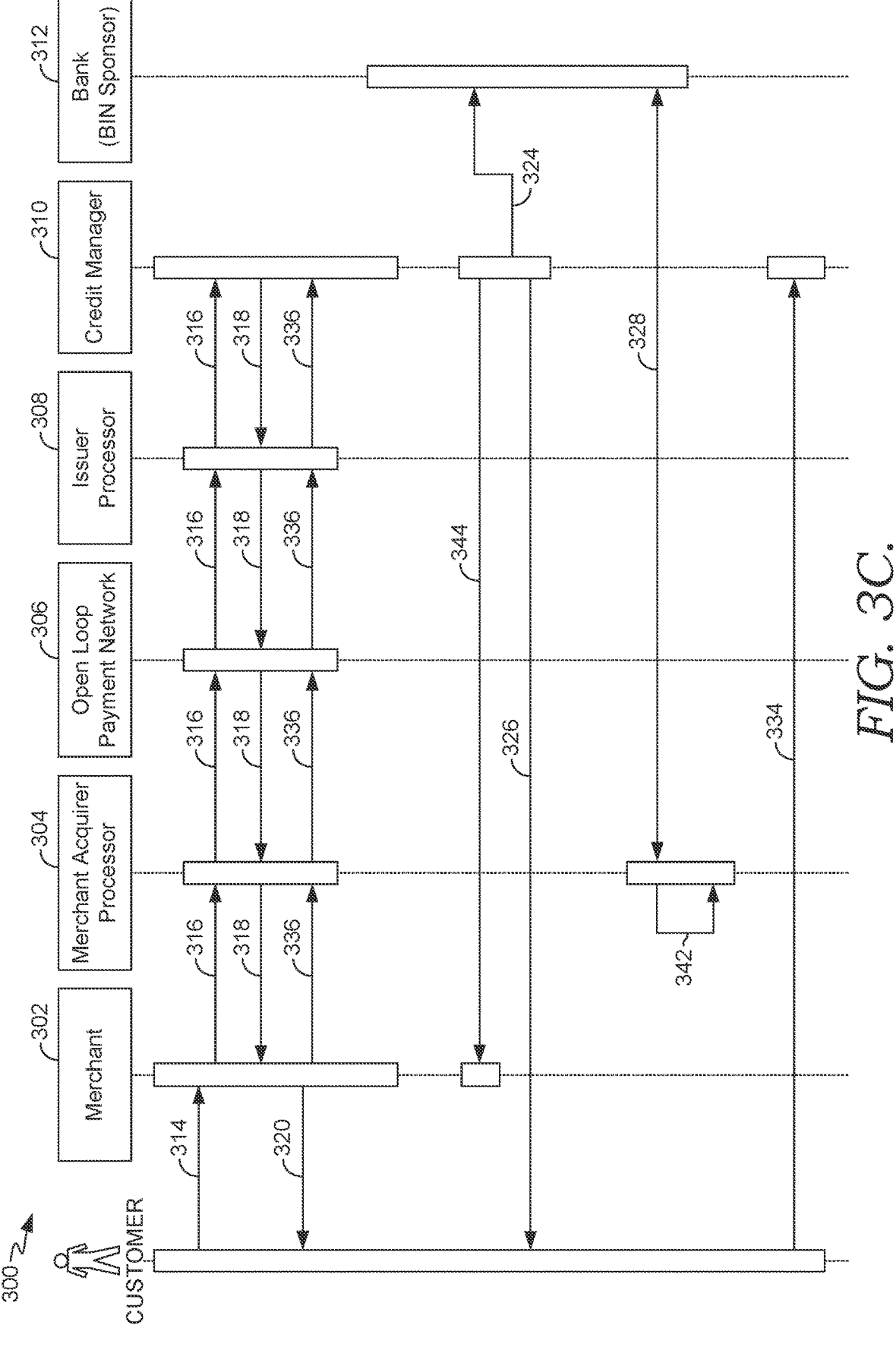

In FIG. 3C at step 344, the credit manager 310 may inquire directly to the merchant 302 to retrieve the SKU-level data. A URL may be provided by the merchant 302. The credit manager 310 is able to use that URL and information contained in the settlement file sent at step 336 to access information related to transactions performed by the merchant 302. The URL may require that the credit manager 310 input transaction specific data in order to access specific transactions. That data may be date, time, location, transaction ID, customer name, customer number, customer account information, or other transaction specific information. The URL may also be transaction specific and go directly to a location that contains SKU-level information that the credit manager 310 requires.

Moving now to FIG. 3C, which incorporates all portions described in FIG. 3A-3B while illustrating an alternative methodology of implementation in connection with the operating environment 300, in accordance with an aspect herein. At step 344, the credit manager 310 may use the data sent by the settlement file in step 336 to query the open loop payment network 306. The open loop payment network 306, in some aspects, maintains a record of transactions and SKU-level data related to the transaction. Instead of querying the merchant 302, the credit manager 310 can collect the information from the open loop payment network 306. This alternative to requesting the date from the merchant 302 may save resources and reducing queries of the merchant 302. For example, if the open loop payment network 306 already has the required data, it may be more efficient to request the data from the open loop payment network 306 instead of from the credit manager 310. In some instances, this information is collected by the open loop payment network 306 directly with the transactions as an additional data field during the transaction.

Figure 3D:
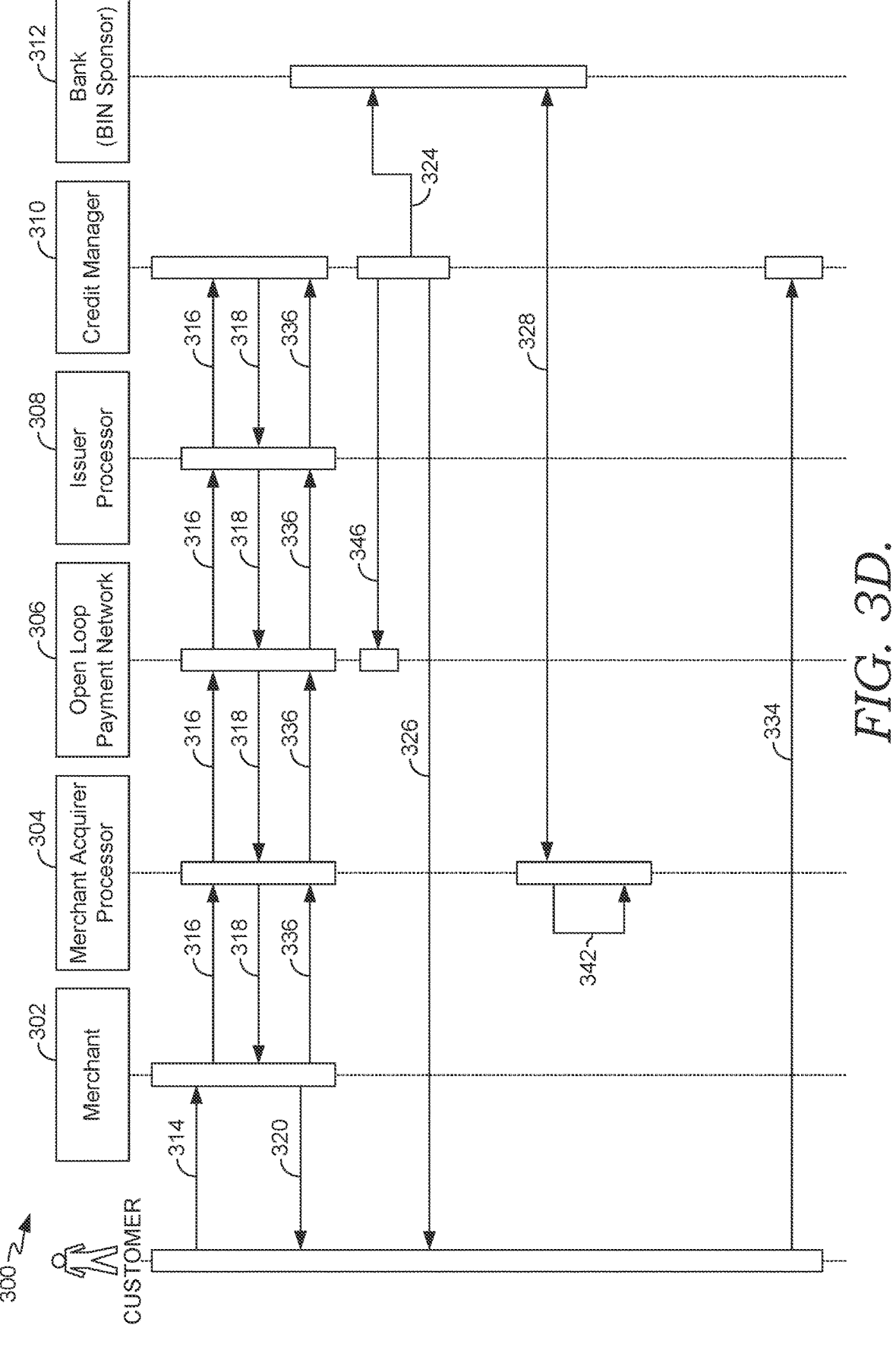

Moving now to FIG. 3D, which incorporates all portions described in FIG. 3A-3C while illustrating an alternative methodology of implementation in connection with the operating environment 300, in accordance with an aspect herein. At step 346 the credit manager 310 may use the data sent by the settlement file in step 336 to query the open loop payment network 306. The open loop payment network 306, in some aspects, maintains a record of transactions and SKU-level data related to the transaction. Instead of querying the merchant 302, the credit manager 310 can just get the information it needs from the open loop network 306 thus saving resources and reducing queries of the merchant 302. For example, if the open loop payment network 306 already has the required data, there is no need to request again by the credit manager 310. In some instances, this information is collected by the open loop payment network directly with the transactions as an additional data field during the transaction.

Figure 3E:
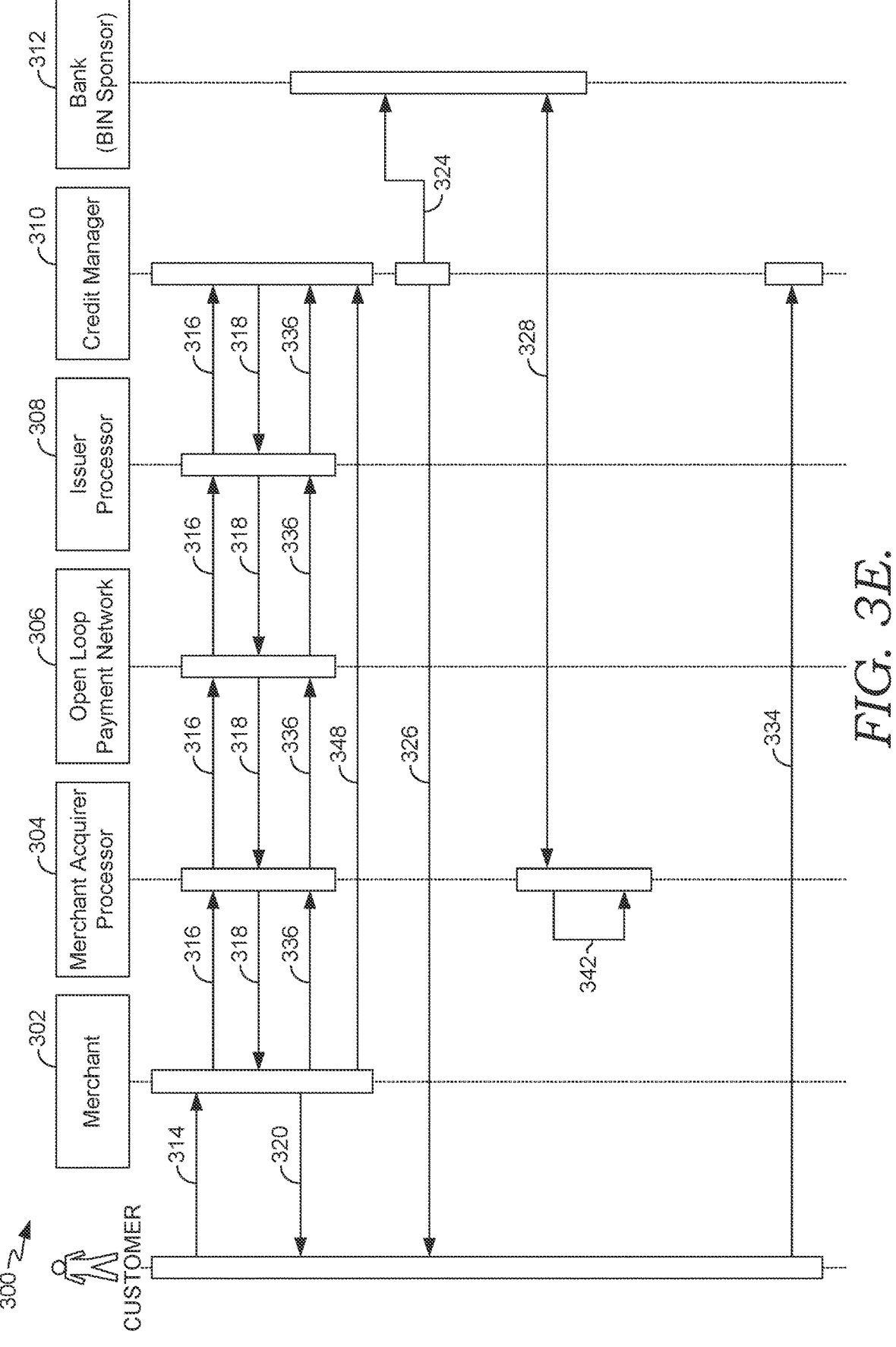

Moving now to FIG. 3E, which incorporates all portions described in FIG. 3A-3D while illustrating an alternative methodology of implementation in connection with the operating environment 300, in accordance with an aspect herein. The merchant 302 implements a procedure to send SKU-level data at step 348 directly to the credit manager 310, such as through an API or similar function. In this example, the communication of data via an API may be in addition to the settlement file sent in step 336. The merchant 302 may have a relationship or authorization to use the open loop payment network 306 and the credit manager 310. For example, the merchant 302 may be approached by the open loop payment network 306 and asked to provide the SKU-level information and the settlement file for each transaction that uses the credit manager 310 approval process. This information may be provided to the open loop payment network 306 and/or directly to the credit manager 310.

Embodiments described above are combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present disclosure is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having," or variations thereof, has the same broad meaning as the word "comprising," and the word "accessing," or variations thereof, comprises "receiving," "referencing," or "retrieving." Further, the word "communicating," or variations thereof, has the same broad meaning as the word "receiving," or "transmitting" facilitated by software or hardware-based buses, receivers, or transmitters using communication media. Also, the word "initiating" or "invoking," or variations thereof, has the same broad meaning as the word "executing" or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present disclosure described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present disclosure may generally refer to the distributed data object management system and the described schematics, it is understood that the techniques described may be extended to other implementation contexts.

From the foregoing, it will be seen that the present disclosure may be well adapted to attain all the ends and objects described above, including other advantages that are obvious or inherent to the structure. It will be understood that certain features and sub combinations are of utility and may be employed without reference to other features and sub combinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media storing computer-readable instructions that when executed by one or more processors, cause the one or more processors to perform operations, the operations comprising:

receiving, by a credit manager processor, a request to authorize a purchase using an open loop payment system at a merchant by a user, the user having a trade credit account with a credit manager, wherein the trade credit account is enabled for use through the open loop payment system, and wherein the request is routed through the open loop payment system to the credit manager distinct from an issuer processor, the credit manager processor approving or declining the purchase based on available trade credit;

determining based on a query of a database, by the credit manager processor, that the user has available credit;

communicating an authorization of the purchase using the open loop payment system to the merchant;

receiving, by the credit manager processor, a set of transaction data for the purchase associated with the authorization;

automatically generating, based on the set of transaction data, an invoice; and communicating, by the credit manager processor, the invoice to the user.

2. The media of claim 1, further comprising communicating to a bank sponsor, a request to fund the purchase associated with the authorization.

3. The media of claim 2, wherein the credit manager receives a notification that the purchase associated with the authorization has been funded.

4. The media of claim 1, wherein the set of transaction data comprises stock keeping unit level data.

5. The media of claim 4, wherein the set of transaction data comprises an itemized list of purchased items.

6. The media of claim 4, wherein the stock keeping unit level data is sent directly from the merchant.

7. A method for a merchant credit application performed by one or more processors comprising:

receiving, by a credit manager processor, a request to authorize a purchase using an open loop payment system at a merchant by a user, the user having a trade credit account with a credit manager, wherein the trade credit account is enabled for use through the open loop payment system, and wherein the request is routed through the open loop payment system to the credit manager distinct from an issuer processor, the credit manager processor approving or declining the purchase based on available trade credit;

determining based on a query of a database, by the credit manager processor, that the user has available credit;

communicating an authorization of the purchase using the open loop payment system to the merchant;

receiving, by the credit manager processor, a set of transaction data for the purchase associated with the authorization;

automatically generating, based on the set of transaction data, an invoice; and communicating, by the credit manager processor, the invoice to the user.

8. The method of claim 7, wherein the set of transaction data comprises a uniform resource locator associated with the purchase and the merchant.

9. The method of claim 7, wherein the set of transaction data comprises a settlement file.

10. The method of claim 7, wherein the set of transaction data is received from an open loop payment network.

11. The method of claim 7, further comprising communicating to a bank sponsor, a request to fund the purchase associated with the authorization.

12. The method of claim 7, wherein the set of transaction data is received by electronic notification from the merchant.

13. A system comprising:

at least one processor; and one or more computer storage media storing computer-readable instructions thereon that, when executed by the at least one processor, cause the at least one processor to perform operations comprising:

receive, by a credit manager processor, a request to authorize a purchase using an open loop payment system at a merchant by a user, the user having a trade credit account with a credit manager, wherein the trade credit account is enabled for use through the open loop payment system, and wherein the request is routed through the open loop payment system to the credit manager distinct from an issuer processor, the credit manager processor approving or declining the purchase based on available trade credit;

determine based on a query of a database, by the credit manager processor, that the user has available credit;

communicate an authorization of the purchase using the open loop payment system to the merchant;

receive, by the credit manager processor, a set of transaction data for the purchase associated with the authorization;

automatically generate, based on the set of transaction data, an invoice; and communicate, by the credit manager processor, the invoice to the user.

14. The system of claim 13, wherein the set of transaction data comprises a uniform resource locator associated with the purchase and the merchant.

15. The system of claim 13, wherein the set of transaction data comprises a settlement file.

16. The system of claim 13, wherein the set of transaction data is received from an open loop payment network.

17. The system of claim 13, further comprising communicating to a bank sponsor, a request to fund the purchase associated with the authorization.

18. The system of claim 13, wherein the set of transaction data is received by electronic notification from the merchant.

19. The system of claim 13, wherein the set of transaction data comprises stock keeping unit level data.

20. The system of claim 19, wherein the set of transaction data comprises an itemized list of purchased items.

* * * * *